United States Patent Office 3,444,747
Patented May 20, 1969

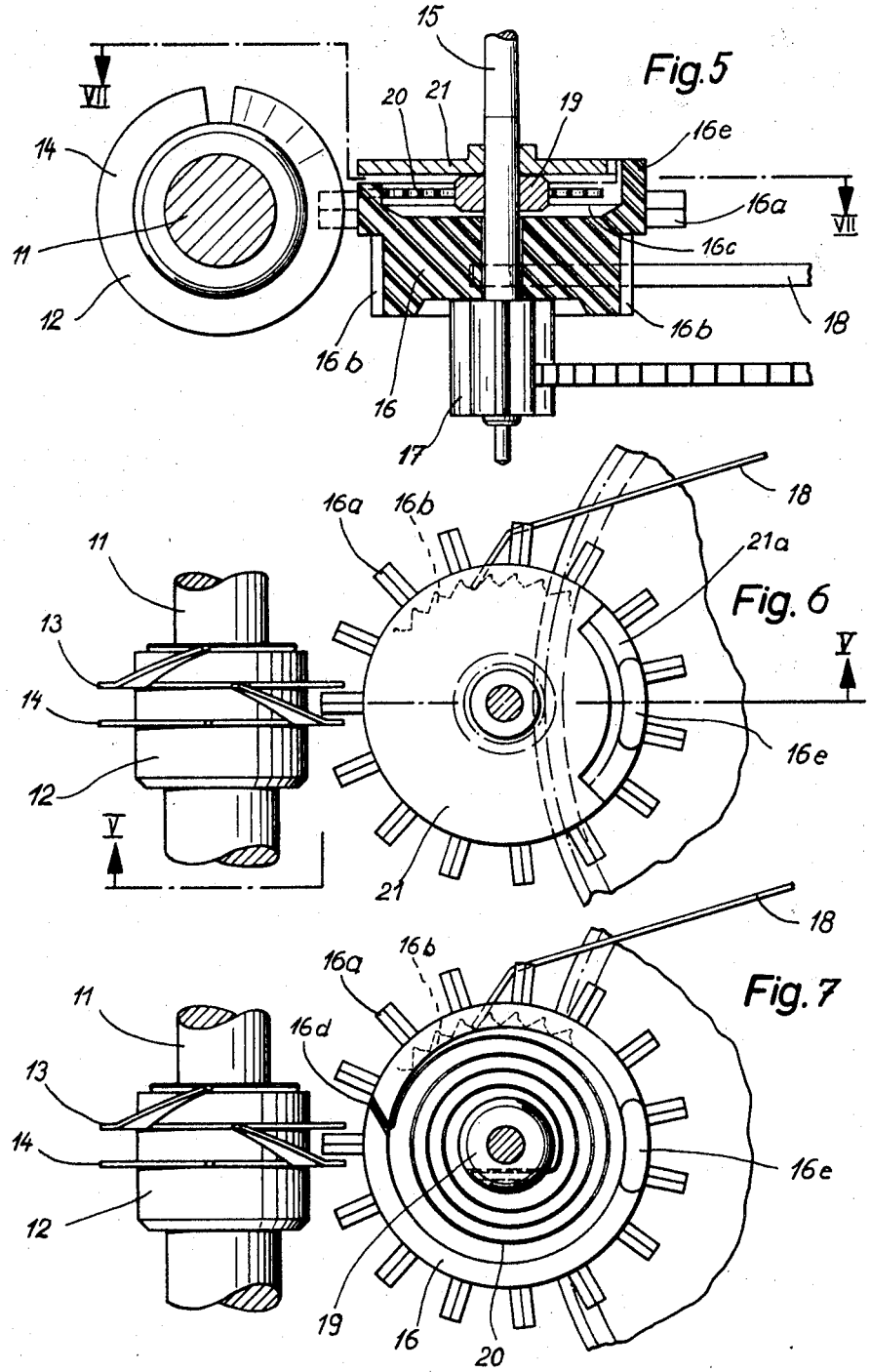

3,444,747
CONTINUOUS SWITCHING DEVICES
Kurt von Zeppelin and Friedrich Fritzof Assmus, Schramberg, Wurttemberg, and Robert Wolber, Lauterbach, Wurttemberg, Germany, assignors to Gebruder Junghans Gesellschaft mit beschrankter Haftung, Schramberg, Wurttemberg, Germany, a corporation of Germany
Filed Sept. 12, 1966, Ser. No. 578,873
Claims priority, application Germany, Sept. 27, 1965,
J 14,256; June 30, 1966, J 31,216
Int. Cl. F16h 29/02
U.S. Cl. 74—88                          9 Claims

ABSTRACT OF THE DISCLOSURE

A control mechanism for precision apparatus with an oscillating switch element to drive a rotating shaft and having an elastic coupling element on the shaft to be switched into the power field between the switch element and the rotating shaft. The precision apparatus is particularly adapted for time-keeping devices.

---

Figure 1:
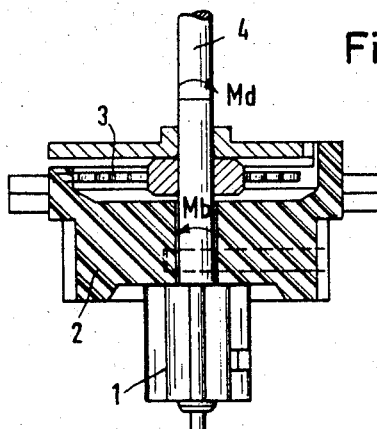

This invention relates to continuous switching devices, with which additional movable members are connected on an outlet side, and it concerns especially control mechanisms for precision apparatus with an oscillating switching member which drives a rotating shaft, especially for time-keeping devices with a counter driven by the movement regulator with a flyback suppressor. In the case of such arrangements of control mechanisms, the switching impulses will cause disturbing noises, whenever the elements of the drive that intermesh will come into force locking contact with one another. However, it is also possible in the case of acceleration of the parts of the gear mechanism that are to be switched continuously, that undesirable forces due to gravity will occur, for example, in the hands, especially on long second hands of watch mechanisms. Also, the reactions of the forces due to gravity on the continuous switching mechanism, can be considerable.

Therefore, the invention is based on the object to eliminate these disadvantageous phenomena, or at least to suppress them to a large extent.

In principle, this will be accomplished by switching in an elastic element, which stretches the switching impulse temporarily and which, at the same time, flattens the amplitude, into the power circuit between the oscillator and the rotating shaft. As a result thereof, it will be necessary to accelerate only the inert (mechanical) mass which lies between the oscillator and the elastic member, without delay; therefore only its mass forces will react on the continuous switching mechanism, while the switching impulse for the parts of the gear mechanism that have been connected on the outlet side, is first of all stored in the elastic member and then retransmitted, stretched and flattened.

Preferably, in that case, the system of the masses of a counter, rigidly coupled with the rotating shaft, is constructed in such a manner that it will be free of natural oscillations and the damping between the masses connected by the elastic coupling element, has been selected such that the compensating movement will be concluded after a switching impulse, prior to the beginning of a new stitching impulse. If, for example, the system has been built up in such a manner, that by a suitable selection of the masses, of the spring forces and of the damping a periodic oscillation will be achieved in which the compensating process will be concluded before the next continuous switching impulse is given to the gear mechanism, then one will achieve the least possible load of the continuous switching element by reactive forces due to gravity of the gear mechanism and the least possible load of the parts of the gear mechanism connected on the outlet side.

In the case of a control mechanism with a switch deflector and deflector wheel, the elastic coupling element can be switched in between the deflector wheel equipped with a locking serration and with the element of the gear mechanism connected on the outlet side therewith, whereby in the case of a special embodiment of the invention, the deflector wheel seats loosely on the shaft driven thereby. This arrangement excels by its simple and compact mode of construction and it offers moreover the possibility to apportion the friction damping between the deflector wheel and the driven shaft, and thus to influence the temporary course of the compensating movement.

The elastic element may be a spiral spring, which in the case of a special construction of the driving mechanism is housed in a cup-shaped recess of the hub of the deflector wheel. In order to prevent the spiral spring from being damaged and in order to avoid a gliding out of the elastic element from the cup, the recess may be covered up with a limiting disc connected rigidly with the shaft, which has a sector-shaped notch, in which a lug cam provided on the deflector wheel is freely movable. By means of this lug cam, the spiral spring when meshing in the gear mechanism is protected from the outside from the excessive forces and during normal operation the lug cam does not come into contact with the limiting disc.

Instead of a corporal spiral spring, the elastic coupling element can also be formed by remote controlled forces by means of magnets and armatures. It is also possible to insert the elastic coupling element between the driving shaft and the switch deflector. As a result thereof, the impulse transferred from the oscillation drive to the switch deflector would have been temporarily stretched and flattened.

Figure 2:
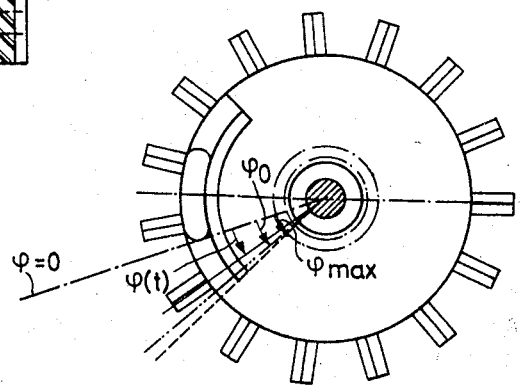
Figure 3:
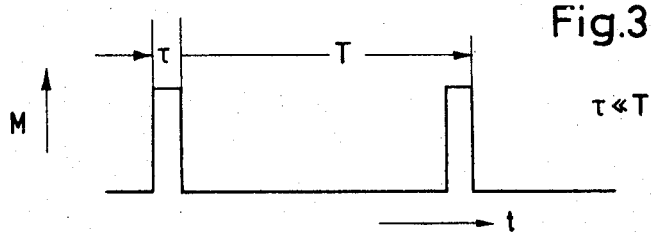
Figure 4:
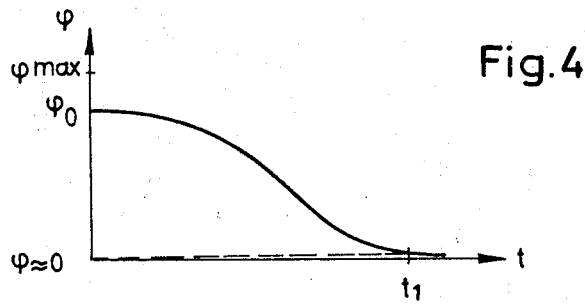
Figure 8:
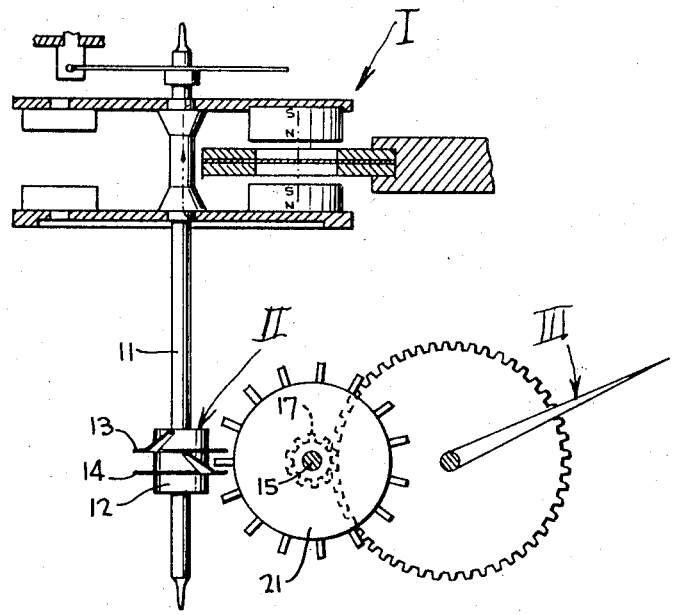

Further objects and advantages of the invention will be apparent from the following description when considered in connection with the accompanying drawings, in which:

FIGURE 1 is a longitudinal sectional view showing two rotary masses connected by an elastic coupling element, FIGURE 2 is a top plan view of FIG. 1 showing the reciprocal angles of twist of the rotary masses, FIGURE 3 is a diagram showing the course of a moment, depending on the time, FIGURE 4 is a diagram showing the angle of twist dependent on the time, FIGURE 5 is a longitudinal cross section through the control mechanism taken on line V—V of FIG. 6 in the direction of the arrows, FIGURE 6 is a top plan view of the control mechanism partly in section, FIGURE 7 is a top plan view similar to FIG. 6 and taken on line VII—VII of FIG. 5 in the direction of the arrows and showing the arrangement of the spiral spring, FIG. 8 is a side elevation, partly in section of the entire mechanism.

Referring to FIG. 1, the basic method of operation of the invention wil be explained. Assuming that the parts 1 and 2 with the mechanical masses $\theta_1$ and $\theta_2$ are coupled rigidly one with the other, it will be necessary during the short continuous switching impulse of a duration $\tau$ to accelerate the entire mass connected with part 1, besides the frictional forces. The course of moment corresponds in the case of some approximations to the Formula 1 appearing in the following. It is obvious that the reaction on the driving part 2 can be considerable.

If, however, the constructional elements are coupled resiliently one with the other by means of an elastic intermediate element, then only that momentum will react, which is required for tension of the elastic intermediate element and which can be described perhaps with the Formula 2 in its first moment. During the pulse intervals $T-\tau$, the spring can bring up the element 1. The temporal moment course has been shown diagrammatically in FIG. 3.

On the assumption that $\theta_1 \gg \theta_2$, the following is approximately true:

$$M' \simeq \theta_1 \dot{\omega} + \mu r G \quad (1)$$

$$M'' \simeq \mu r G \quad (2)$$

it is $$M' > M''$$

($G$=weight, $\mu$=friction coefficient, $r$=friction radius, $\dot{\omega}$=angular acceleration.)

Furthermore, one must require that the system rigidly connected with part 1, must be free of natural oscillations, particularly in the case that with the part 1, connected on the outlet side, an indicating device, for example, a hand, would be connected. This is important since the entire system represents a structure capable of oscillations by means of the spring, which can execute natural oscillations around its zero position. Therefore, part 1, as compared to part 2, must receive a corresponding damping.

To calculate the damping, one must start out from the fact that the constructionally fixed maximum possible oscillation angle will be $\pm \varphi$max greater than greater than the permissible angle of twist $\varphi_0$ (see FIG. 2).

The damping between parts 1 and 2 is selected such, that for the damping moment the relation $M_b = b \dot{\varphi}$ will apply, whereby $b$ is a constant, which depends on the bearing geometry and the lubrication conditions between part 1 and part 2, and which may be selected within wide limits. The elastic coupling element 3 has a driving moment $M_d = c \cdot \varphi$.

The differential equation:

$$\theta_1 \cdot \ddot{\varphi} + b \cdot \dot{\varphi} + c \cdot \varphi = 0$$

is true for the part 1 with the mechanical moment of inertia.

$\theta_1$ reduced to its shaft, of all rotary masses connected on the outlet side.

If one places $$b/\theta_1 = 2\beta \text{ and } c/\theta_1 = \varphi^2 \quad (3)$$

then $$\ddot{\varphi} + 2\beta \dot{\varphi} + \alpha^2 \varphi = 0$$

The solution of this differential equation is the general integral of the form $$\varphi = A \cdot e^{h_1 t} + B \cdot e^{b_2 t}$$

with $$h_{1,2} = -\beta \pm \sqrt{\beta 2 - \alpha^2}$$

as the characteristic equation.

If the damping for the achievement of the after-run is supposed to be strong, then $$\beta^2 > \alpha^2, \text{ i.e., } h_{1,2} = -\beta \pm k \quad (4)$$

whereby $$k < \beta$$

The dependence on time of the angle of twist is represented by the following equation:

$$\varphi = e^{-\beta t}(A e^{kt} + B e^{-kt})$$

In the present case, after the deflection of the continuous switching wheel 2, the starting conditions for the driven element 1 are $$t = 0, \varphi = \varphi_0, \dot{\varphi} = 0$$

and the angle of deflection being according to the equation $$\varphi = \frac{e^{-\beta t}}{2k} \varphi_0 [(k+\beta) e^{kt} - (\beta-k) e^{-kt}] \quad (5)$$

FIG. 4 shows the course of this equation.

The time $t_1$ has been presupposed by the fact that the after-run process must be concluded whenever the next impulse comes to element 2. That is to say, in the case of a pulse spacing of $T = 0.2$ sec and of a safety of $S = 0.5$ to 0.75, the time $t_1$ become equal to $S \cdot T$, about 0.1 to 0.15 sec.

With the aid of the Equations 3, 4 and 5, the bearing relationships must be dimensioned in such a manner, that the required damping effect will be achieved.

In FIGS. 5 to 7 a preferred embodiment of the control mechanisms according to the invention has been shown. A switch deflector 12, with switch disks 13 and 14, seats firmly on the driving shaft 11, rigidly connected with an oscillating switching element (not shown). A common shaft 15 of a deflector wheel 16, seated rotatably on this shaft, and of a driving mechanism 17, has been attached obliquely in relation to shaft 11, with such a distance to this latter that the teeth 16a of the deflector wheel will mesh between the switching disks 13 and 14, and the deflector wheel in the case of rotational oscillations of the switch deflector, will be placed into a periodic or an intermittent rotational movement by the latter. The hub of the deflector wheel, which is preferably made from some synthetic material, has on its surface, beside the deflector wheel teeth 16a, tip-stretched locking wheel teeth 16b, which cooperate with a locking spring 18. On one front side, the body of the deflector wheel has been provided with a cup-shaped recess 16c, in which a spiral spring 20, connected with a spiral sleeve or bushing 19, is placed at one end (see also FIG. 3). The recess 16c is covered up by a limiting disk 21, covering by a small distance the edge of the deflector wheel, and which will prevent the spiral spring 20, which had been hooked in at the other end into a slit 16d in the edge of the body of the deflector wheel, from gliding out from this attachment, while a cam 16e, lying about opposite to the slit 16d on the periphery, projects into a sector-shaped notch 21a of the limiting disk 21, as a result of which an excessive twisting of the deflector wheel in relation to the shaft 15 and thus a damaging of the spring 20 will be prevented.

The driver or gear 17 is pressed securely on to the shaft 15 on one side of the deflector wheel, and on the other side the spiral sleeve 19 and the limiting disc 21, together these parts represent a mechanical unit. The deflector wheel 16, which is made of one piece, preferably of synthetic material, with its locking serration, seats between the driver 17 and the spiral bushing 19 on the shaft, rotatable with an easy motion and is limited in its axial movement by those two elements.

FIG. 8 shows the entire mechanism that is, an oscillating switching element I, a control movement regulator II, and a pointer III. The pointer or indicator III is connected to the movement of the time-keeping device and thus FIG. 8 shows the entire mechanism including of of course the control mechanism having the various elements as described.

The method of operation of the control mechanism is such, that by the rotational oscillation of the driving shaft 11 and of the switch deflector located thereon, the deflector wheel is set into a periodic or intermittent movement, step by step, in a known manner, by the conductor ramps on the switching disks 13 and 14. In consequence of the frictional forces and, above all, of the mechanical masses in the counter connected on the outlet side, this movement impulse, however, is not immediately transferred further in the same form to the driver and thus to the counter, but the spiral spring 20, inserted between the deflector wheel seating rotatably on the shaft 15 and the spiral bushing 19 pressed firmly on to the shaft, absorbs a part of the impulse energy temporarily depending on the reaction force and then transfers said impulse, stretched and flattened, to the counter connected on the outlet side, as a result of which the moment of acceleration is decreased and thus also the load on the counter and driving wheels and on the control mechanism. One consequence is a longer maintenance of the shape and therewith a longer life span of the switching and counter mechanisms and, furthermore, a smaller development of noise. The spring 20 must be dimensioned such and must be tuned to the frictional and mass forces, so that the impulse will be transferred with certainty, a short time prior to the beginning of the next switching process to the counter connected on the outlet side, so that the spring therefore will be untensed at the beginning of each switching step.

The invention is not limited to the example just described. The elastic element can be formed, for example, by magnetic forces, whereby, for example, magnets can be attached to the deflector wheel and magnet armatures on the limiting disk. On the other hand, it would also be possible to connect the deflector wheel rigidly with the shaft 15 and the drive 17, which in this case would have to be located on the same side of the deflector wheel as the spring 20, arranged rotatably on the shaft.

Basically, for the purpose of stretching and flattening the switching impulse, it is also possible to insert the elastic element between the switch deflector and the driving shaft. In that case, however, one must take care by selection of the spring, that in the case of the oscillating movement of the drive no switching process will be omitted, since otherwise the isochronism will not be maintained.

The locking arrangement can be executed differently from the construction shown herein, with locking teeth and locking spring, also with the use of magnetic forces, as a result of which the noise starting from this arrangement will be eliminated.

We claim:
1. Control mechanism for precision apparatus comprising a rotating shaft, a counter driven by a movement regulator, with a flyback suppressor, and an elastic coupling element on the shaft adapted to be switched into a power train between the oscillating switching element and the rotating shaft.
2. Control mechanism according to claim 1 in which a system of masses are provided for the counter coupled rigidly with the rotating shaft and being free of natural oscillations, and a damping provided between the masses connected by the elastic coupling element so that a compensating movement after one switching impulse is concluded prior to a beginning of a new switching impulse.
3. Control mechanism according to claim 1, in which a switch deflector and a deflector wheel provided with a locking serration are provided, so that the elastic coupling element is switched in between the deflector wheel and a member of a gear mechanism.
4. Control mechanism according to claim 1, in which a switch deflector and a deflector wheel provided with a locking serration are provided, so that the elastic coupling element is switched in between the deflector wheel and a member of a gear mechanism, the deflector wheel seating loosely on the shaft driven thereby.
5. Control mechanism according to claim 1, in which the elastic coupling element is a spiral spring.
6. Control mechanism according to claim 1, in which a switch deflector and a deflector wheel provided with a locking serration are provided, so that the elastic coupling element is switched in between the deflector wheel and between a member of a gear mechanism, the elastic element being in the form of a spiral spring mounted in a cup-shaped recess of a hub of the deflector wheel.
7. Control mechanism according to claim 1, in which a switch deflector and a deflector wheel provided with a locking serration are provided, so that the elastic coupling element is switched in between the deflector wheel and between a member of a gear mechanism, the elastic element being in the form of a spiral spring mounted in a cup-shaped recess of a hub of the deflector wheel, and in which a limiting disk is provided to cover the recess of the deflector wheel and which is rigidly connected with its shaft, said disk having a sector-shaped notch therein, and a cam is provided on the deflector wheel which is freely movable.
8. Control mechanism according to claim 1, in which the elastic coupling element is composed of magnets and magnet-armatures.
9. Control mechanism according to claim 1, in which the elastic coupling element is inserted between a driving shaft and the switching element.

References Cited
UNITED STATES PATENTS 2,464,316    3/1949    Jeanneret _____ 58—116 XR

FOREIGN PATENTS 738,356    10/1955    Great Britain.

FRED C. MATTREN, JR., *Primary Examiner.*

F. D. SHOEMAKER, *Assistant Examiner.*

U.S. Cl. X.R.

58—116